(12) United States Patent
Toshine (10) Patent No.: US 7,668,875 B2
(45) Date of Patent: Feb. 23, 2010

(54) DATA STORAGE DEVICE, METHOD OF REARRANGING DATA AND RECORDING MEDIUM THEREFOR

(75) Inventor: Naoyoshi Toshine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 11/864,402

(22) Filed: Sep. 28, 2007

(65) Prior Publication Data

US 2008/0140730 A1 Jun. 12, 2008

(30) Foreign Application Priority Data

Dec. 11, 2006 (JP) ............................. 2006-333735

(51) Int. Cl.
*G06F 17/30* (2006.01)
(52) U.S. Cl. ...................... 707/202; 707/100
(58) Field of Classification Search ................. 707/100, 707/202, 205
See application file for complete search history.

(56) References Cited

U.S. PATENT DOCUMENTS 6,778,346 B2 * 8/2004 Takayama et al. ............. 360/69
7,231,130 B2 * 6/2007 Ohno et al. ................... 386/46
2006/0015680 A1 1/2006 Otsuka et al.

FOREIGN PATENT DOCUMENTS

| JP | 7-262058 | 10/1995 |
|---|---|---|
| JP | 2002-520692 | 7/2002 |
| JP | 2005-50104 | 2/2005 |
| JP | 2006-31446 | 2/2006 |
| WO | 00/02124 | 1/2000 |

OTHER PUBLICATIONS

Korean Office Action mailed Jul. 22, 2009, issued in corresponding Korean Patent Application 10-2007-104503.

* cited by examiner

*Primary Examiner*—Cheryl Lewis
(74) *Attorney, Agent, or Firm*—Staas & Halsey LLP (57) ABSTRACT

When there is a constituent tape that is other than the process target magnetic tape (Yes in step S15), valid data on the process target magnetic tape is copied onto that constituent tape (step S22). For this process, the magnetic tape that stores the largest amount of valid data in relation to invalid data stored on the process target magnetic tape is determined to be the copy destination.

9 Claims, 7 Drawing Sheets

60 STORING HISTORY DATA TABLE

| VOLUME NUMBER | MRB NUMBER | MAGNETIC TAPE ID | DATA POSITION NUMBER | STORAGE TIME AND DATE |
|---|---|---|---|---|
| 3 | 0 | 123 | 5 | 2005/10/01  13:20:00 |
| 3 | 1 | 123 | 3 | 2005/10/01  13:13:10 |
| 20 | 2 | 159 | 3 | 2005/12/01  13:25:30 |
| 20 | 5 | 159 | 1 | 2005/10/06  03:10:50 |
| ... | ... | ... | ... | ... |
| 3 | 1 | 124 | 4 | 2005/10/02 |

FIG. 7

DATA STORAGE DEVICE, METHOD OF REARRANGING DATA AND RECORDING MEDIUM THEREFOR

CROSS REFERENCE TO RELATED APPLICATIONS

This application is based on and hereby claims priority to Japanese Application No. 2006-333735 filed on Dec. 11, 2006, the contents of which are hereby incorporated by reference.

BACKGROUND OF THE INVENTION

1. Field of the Invention

The present invention relates to a hierarchical data storage device that uses a library device of a storage medium (sequential access storage medium) such as a magnetic tape or the like on which data is stored through sequential access in an information management system, and particularly to a method of extracting only valid data from data in a sequential access storage medium in order to rearrange the extracted valid data in another sequential access storage medium.

2. Description of the Related Art

As conventional information management systems, hard disk devices are mainly used because hard disks allow for large capacity access at a high speed. In order to cope with situations in which data stored in hard disk devices is lost, data is stored on magnetic tapes or the like for backup purposes. Some standards for such magnetic tapes have been defined. For example, in a standard named LTO (Linear Tape-Open), a cartridge that covers one particular magnetic tape is designed to be smaller than that covering other magnetic tapes, and eight heads are used for reading and writing data, thereby achieving data access at high speed.

As a hierarchical storage system based on information life cycle management began to be realized, devices that use virtual magnetic tape library devices as a part of their hard disk devices started to be developed. Therefore, methods have been invented in which magnetic tape media, instead of being used for the conventional purposes of backup, are used as logical volumes in a unit including a plurality of tape media.

Magnetic tape is a storage medium in which data is stored through sequential access. Accordingly, when updated data is written, data that is not updated becomes invalid, and areas that are being used unnecessarily arise. When the amount of invalid data increases in a set of magnetic tapes, the area available for newly storing data decreases, and thus a greater number of magnetic tapes are required, which is problematic in view of cost.

In this document, large capacity storage media such as the magnetic tapes mentioned above or the like for data writing/reading through sequential access are referred to as "sequential storage media". In contrast, storage media such as the above hard disk devices for data writing/reading through random access are referred to as "random storage media".

As a method of solving this problem, a method called "garbage collection" has been suggested in which invalid data is detected on the basis of history information of data recorded on a magnetic tape that comes from data recorded on the magnetic tape, and data from which the invalid data has been removed (valid data) is recorded on a new magnetic tape (Patent Document 1).

Patent Document 1

Japanese Patent Application Publication No. 2006-31446

When the above method in Patent Document 1 is implemented, notwithstanding the fact that one more magnetic tape in use (referred to as constituent tape) can be used as the newly prepared magnetic tape, the new magnetic tape cannot be handled as a blank storage tape unless all the pieces of valid data stored on the magnetic tapes that are process targets become invalid (in other words, the magnetic tape cannot be handled even if only one piece of data remains valid); accordingly, this makes it difficult to reduce the number of tapes in use, which is problematic. Also, pieces of data that were sequentially stored on one magnetic tape are discretely stored on a plurality of magnetic tapes due to the garbage collection process (pieces of valid data are discretely stored). This discreteness sometimes causes performance deterioration when sequential reading is executed on logical volumes.

Accordingly, it is necessary to realize an optimization mechanism for rearrangement of data performed in the garbage collection process for storage media storing data through sequential access.

SUMMARY OF THE INVENTION

It is an object of the present invention to provide a data storage device, a storage medium, or the like by which an optimization of a rearrangement of data in magnetic tapes used in a hierarchical storage system is realized.

The data storage device according to the present invention is a data storage device for storing, in a sequential storage medium that stores data through sequential accesses, data stored in a random storage medium that stores data through random accesses, comprising:

history storing means storing, when data is stored in the sequential storage medium, history information on the stored data; and data re-storing means discriminating between valid data and invalid data that are stored in the sequential storage medium that is an arbitrary process target, and storing, at an arbitrary timing and on the basis of the discrimination result and the storing history stored by the history storing means, the valid data in a sequential storage medium in use that is other than the process target sequential storage medium.

When, for example, there is a plurality of storage media that are in use and that are other than the process target sequential storage medium, the data re-storing means stores the valid data in the sequential storage medium that is storing the largest amount of valid data that corresponds to the invalid data stored in the process target sequential storage medium.

Also, when, for example, there is not a sequential storage medium that is in use and that is other than the process target sequential storage medium, or when none of the sequential storage media that are in use and that are other than the process target have an unoccupied area, the data re-storing means stores the valid data in a new sequential storage medium.

Also, the invalid data is data that exists before an update in cases in which data stored in the random storage medium is updated and the updated data is stored in the sequential storage medium, and valid data of the process target sequential storage medium that is stored in the sequential storage medium that is in use and that is other than the process target sequential storage medium is also handled as invalid data; and when the process target sequential storage medium has no more valid data, the data re-storing means handles the process target sequential storage medium as a blank medium.

BRIEF DESCRIPTION OF THE DRAWINGS

FIG. 7 shows an example of a storage medium storing a program and the like, and the downloading of the program and the like.

DESCRIPTION OF THE PREFERRED EMBODIMENTS

Hereinafter, embodiments of the present invention will be explained by referring to the drawings.

First, a concept of a data storage control process according to the present invention will be explained.

Figure 1:
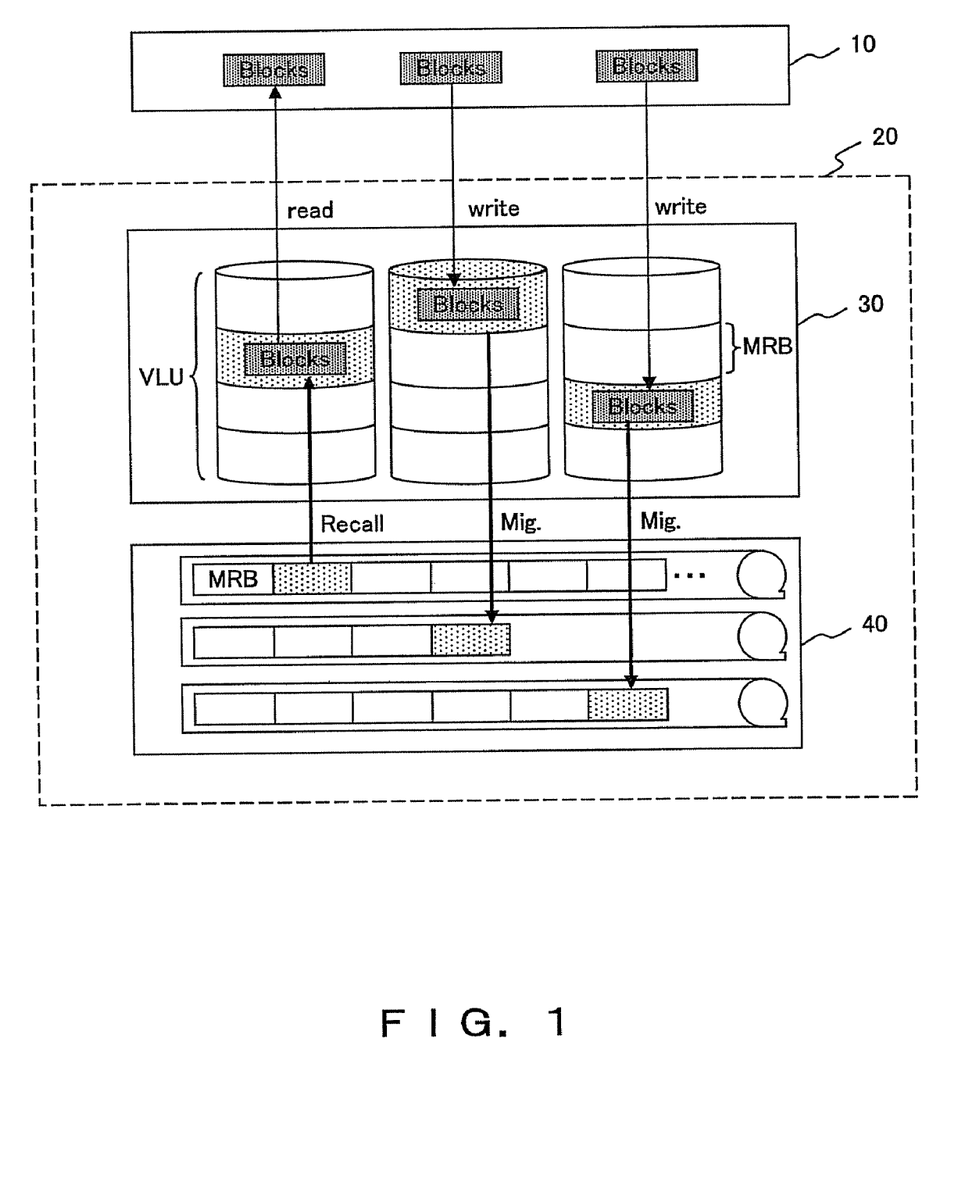
FIG. 1 shows a fundamental data backup process for a data storage device according to the present invention.

FIG. 1 shows a fundamental data backup process for a data storage device 20 according to the present invention.

In the present method, tape library information including storing history information is stored in a database in a hierarchical storage system. Also, it is assumed that by using dedicated software, data is transferred between superior storage devices (hard disk devices) and subordinate storage devices (tape library devices), and that all the pieces of information for users are stored in the tape library devices.

Figure 2:
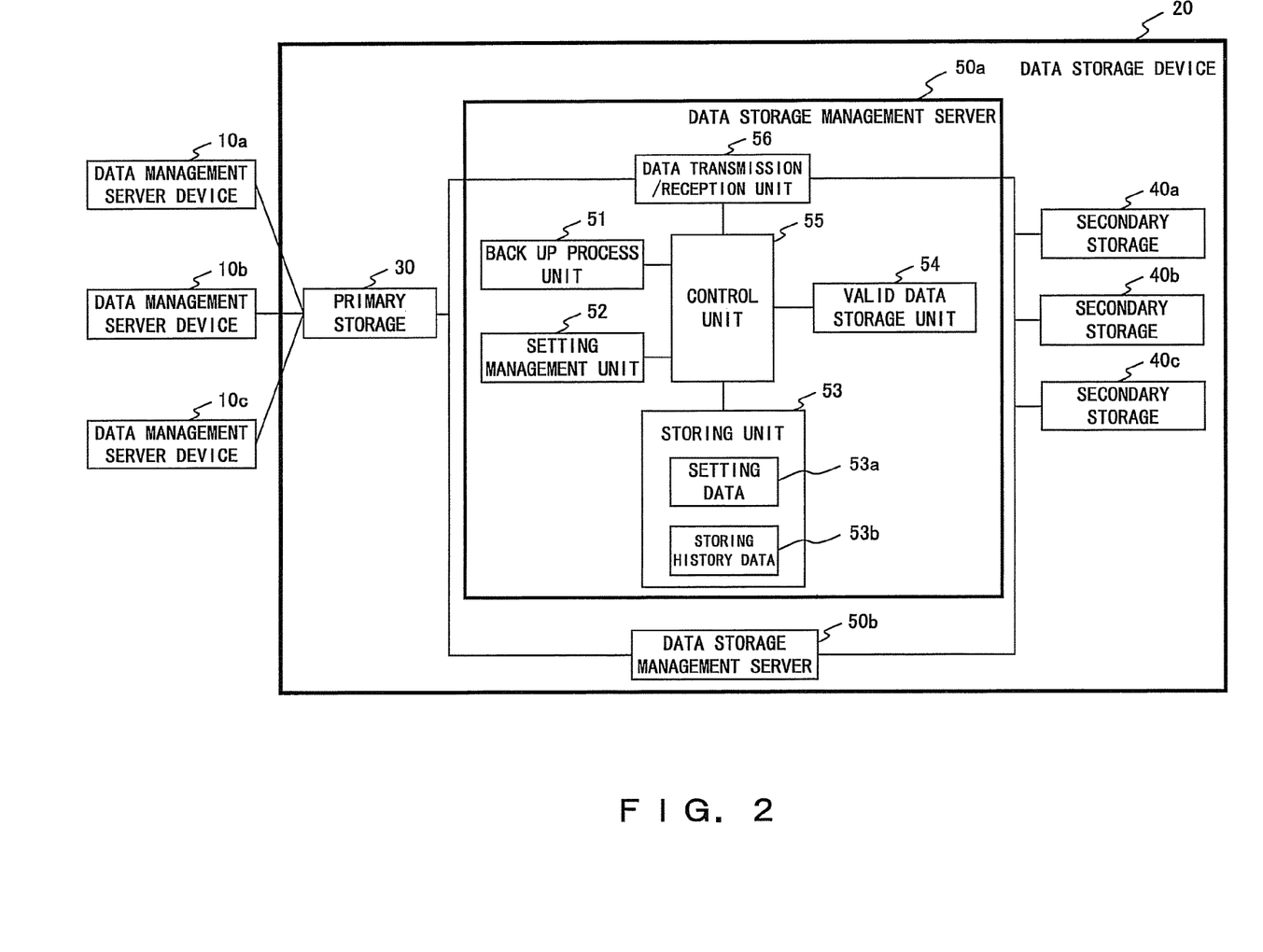
FIG. 2 shows a functional configuration of the data storage device according to the present embodiment.

Also, the configurations shown in FIGS. 1 and 2 are substantially the same as those disclosed in the above prior patent application (Patent Document 1), the difference being a processing function of a valid data storage unit 54.

As shown in FIG. 1, a data management server device 10 accesses the data storage device 20 in order to read and write data in a block unit. The data management server device 10 is a server device used for managing documents, images, data obtained through experiments performed in the course of research, or the like. The data storage device 20 receives read/write requests from the data management server device 10, and performs a reading process or a writing process of data.

This data storage device 20 uses a group of hard disk storage devices as a primary storage 30, and uses a group of magnetic tape storage devices as a secondary storage 40. The primary storage 30 functions on the basis of the RAID (Redundant Arrays of Independent Disks) technique in which a plurality of hard disk devices are unitarily managed as if they were one hard disk device. As described in the description in the prior art section, large capacity storage media (secondary storage) such as magnetic tapes that allow data reading and writing through sequential access are referred to as "sequential storage media", and storage media (primary storage) such as the above hard disk devices or the like allowing data reading and writing though random access are referred to as "random storage media" in this document.

The respective hard disk devices are managed as virtual logical units (VLUs). Also, each virtual logical unit is divided into blocks (Migration/Recall Blocks: MRBs) that are units for reading data from and writing data to the secondary storage 40. Usually, the size of this MRB is from several tens of megabytes to several hundreds of megabytes.

Data about which a write request is received by the data management server device 10 is stored to the primary storage 30 (write). Then, the data stored in the primary storage 30 is stored on the magnetic tapes in the secondary storage 40 at a certain timing for backup purposes (Migration; Mig.).

Also, among the data stored in the secondary storage 40 as the backup data, the data that has to be referred to by the data management server device 10 is read out to the primary storage 30 as necessary (recall), and the data is further read out to the data management server device 10 (read).

The primary storage 30 accesses data faster than the secondary storage 40, and the secondary storage 40 has a larger capacity than the primary storage 30. Therefore, a data storage configuration that combines the merits of the primary storage 30 with those of the secondary storage 40 can be achieved by combining them as described above.

The control of the reading and writing of data between the primary storage 30 and the secondary storage 40 is performed by a data storage management server 50 (will be described later), and the data management server device 10 performs the reading and writing of data only between the primary storage 30 and the data management server device 10 itself. Because of this, the data management server device 10 can use the primary storage 30 as if the primary storage 30 were a large capacity storage device.

Next, a functional configuration of the data storage device 20 according to the present embodiment will be explained.

FIG. 2 shows the functional configuration of the data storage device 20 according to the present embodiment.

As shown in FIG. 2, the data storage device 20 is connected to data management server devices 10a through 10c via a network. The data management server devices 10a through 10c correspond to the data management server device 10 shown in FIG. 1.

The data storage device 20 employs a configuration in which the primary storage 30, data storage management servers 50a and 50b, and secondary storages 40a through 40c are connected to one another. The primary storage 30 corresponds to the group of hard disk devices shown in FIG. 1, and the secondary storages 40a through 40c correspond to the magnetic tape storage devices that constitute the secondary storage 40 shown in FIG. 1.

The data storage management servers 50a and 50b backup to the magnetic tapes the data stored in the primary storage 30, and return to the primary storage 30 the data backed up to the magnetic tapes in the secondary storages 40a through 40c as necessary.

The data storage management servers 50a and 50b also execute the same processes as those executed by the garbage collection process disclosed in the above described prior patent application (Patent Document 1). However, although a new magnetic tape (a tape that is a blank tape, i.e., not a constituent tape) is added as a constituent tape serving as the destination of garbage collection (the destination of copying valid data) in the technique in the prior patent application, existing constituent tapes (tapes in use) are effectively used in the present method. This configuration will be described later in detail. Additionally, the configuration in FIG. 2 comprises two data storage management servers 50a and 50b for the purpose of redundancy to cope with failures.

As shown in FIG. 2, the data storage management server 50a comprises a backup process unit 51, a setting management unit 52, a storing unit 53, a valid data storage unit 54, a control unit 55, and a data transmission/reception unit 56.

Additionally, the data storage management server 50b comprises the same units as those in the data storage management server 50a, which are thus omitted in FIG. 2.

The data transmission/reception unit 56 transmits and receives data between the primary storage 30 and the secondary storages 40a through 40c. The backup process unit 51 performs the process of backing up the data stored in the primary storage 30 to the magnetic tapes in the secondary storages 40a through 40c through sequential access. Also, the backup process unit 51 additionally performs the process of reading out to the primary storage 30 the data stored on the magnetic tapes in the secondary storages 40a through 40c.

When backing up the data stored in the primary storage 30, the backup process unit 51 stores in the storing unit 53 storing history data 53b on the data stored on the magnetic tapes in the secondary storages 40a through 40c.

The setting management unit 52 receives the information on the settings such as the time and date at which the backup process or the garbage process is to be executed, and stores the information in the storing unit 53 as the setting data 53a. This setting can be performed by the respective data management server devices 10a through 10c. The primary storage 30 transmits to the setting management unit 52 the information on the settings transmitted from the data management server devices 10a through 10c.

The storing unit 53 is a storage device such as a hard disk device, a memory unit or the like. As described above, this storing unit 53 stores the setting data 53a and the storing history data 53b. As described above, the setting data 53a is data on the settings such as the time and date at which the backup process or the garbage process is to be executed. The storing history data 53b is data on the history of processes of backing up data stored in the primary storage 30 to the magnetic tapes in the secondary storages 40a through 40c.

The control unit 55 controls the entirety of the data storage management server 50a, such as the data transmission/reception among the respective function units.

Figure 3:
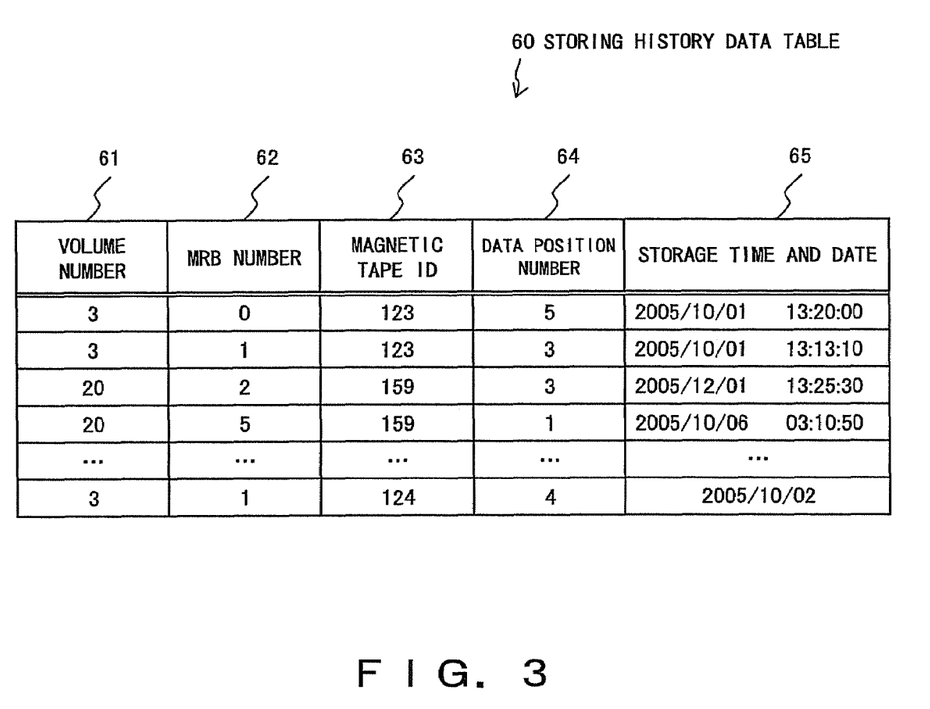
FIG. 3 shows an example of a storing history data table.

FIG. 3 shows an example of a storing history data table 60 for storing the respective pieces of the storing history data 53b. On the storing history data table 60, one piece of the storing history data 53b is stored for each single record. As shown in FIG. 3, one record consists of the data items of a volume number 61, an MRB number 62, a magnetic tape ID 63, a data position number 64, and a storage time and date 65.

Additionally, on the storing history data table 60, not only the storing history on valid data (latest data), but also the storing history on invalid data (old data) is stored.

The volume number 61 is a number (numerical label) assigned to each virtual logical unit in the primary storage 30, and serves as an identification number specifying the virtual logical unit in which the backed-up data is stored.

The MRB number 62 is a number (numerical label) assigned to each MRB in each virtual logical unit, and serves as an identification number specifying the MRB in which the backed-up data is stored. The magnetic tape ID 63 is an identification number assigned to the magnetic tape to which the data was backed up. The storage time and date 65 is data on time and date at which the data was backed up to the magnetic tape.

The data position number 64 is a number (numerical label) specifying the position at which the data was stored on the magnetic tape that is identified on the basis of the magnetic tape ID 63. This data position number 64 is a number that is assigned to each block in the order starting from the first block on the magnetic tape on which the storage area is divided into blocks (MRBs) that are units for data reading/writing.

FIG. 2 is explained again. When receiving a request to execute the garbage collection process, the valid data storage unit 54 detects valid data stored on the magnetic tape that is the process target, and performs control of the secondary storages 40a through 40c such that the detected valid data is stored on another magnetic tape. Alternatively, it is also possible to employ the configuration in which invalid data stored on a magnetic tape is detected, and the secondary storages 40a through 40c are controlled such that data other than the detected invalid data is stored on another magnetic tape as valid data.

The important feature of the present invention lies in this valid data storage unit 54. Specifically, one of the tapes that are used (i.e., one of the constituent tapes) is used as the above "another magnetic tape" when one of the constituent tapes can be used in the present method, whereas in the method disclosed in Patent Document 1, a newly prepared tape is used as the above "another magnetic tape". Further, in the present invention, by determining the constituent tape that is the copy destination by using the invalid data, the discreteness of valid data is suppressed. This point will be explained in detail hereinbelow.

In the above valid data storage unit 54 according to the present method, valid data is not copied onto a new tape, but is copied onto another magnetic tape that is currently being used (i.e., constituent tape) on the condition that the magnetic tape has an unoccupied area, which is different from the method in Patent Document 1. By employing this configuration, it is possible to prevent a situation in which the number of constituent tapes increases easily. "Another tape that is currently used" is a magnetic tape used in the logical volume (virtual logical unit) that includes the magnetic tape of the process target. Further, in the present embodiment, in order to achieve the effect of "the number of processes for mounting and unmounting magnetic tapes upon sequential reading in units of volume can be reduced in order to improve reading performance", the magnetic tape storing the largest amount of valid data in relation to invalid data in the magnetic tape as the process target is selected to be the copy destination. However, when that magnetic tape does not have an unoccupied area, another constituent tape is selected to be the copy destination although a magnetic tape used as the copy destination can be arbitrarily selected, or, for example, the magnetic tape that has the largest unoccupied area can be selected as the copy destination. Also, when none of the constituent tapes has an unoccupied area, a new magnetic tape is used. An example of this process is shown in FIG. 4.

Figure 4:
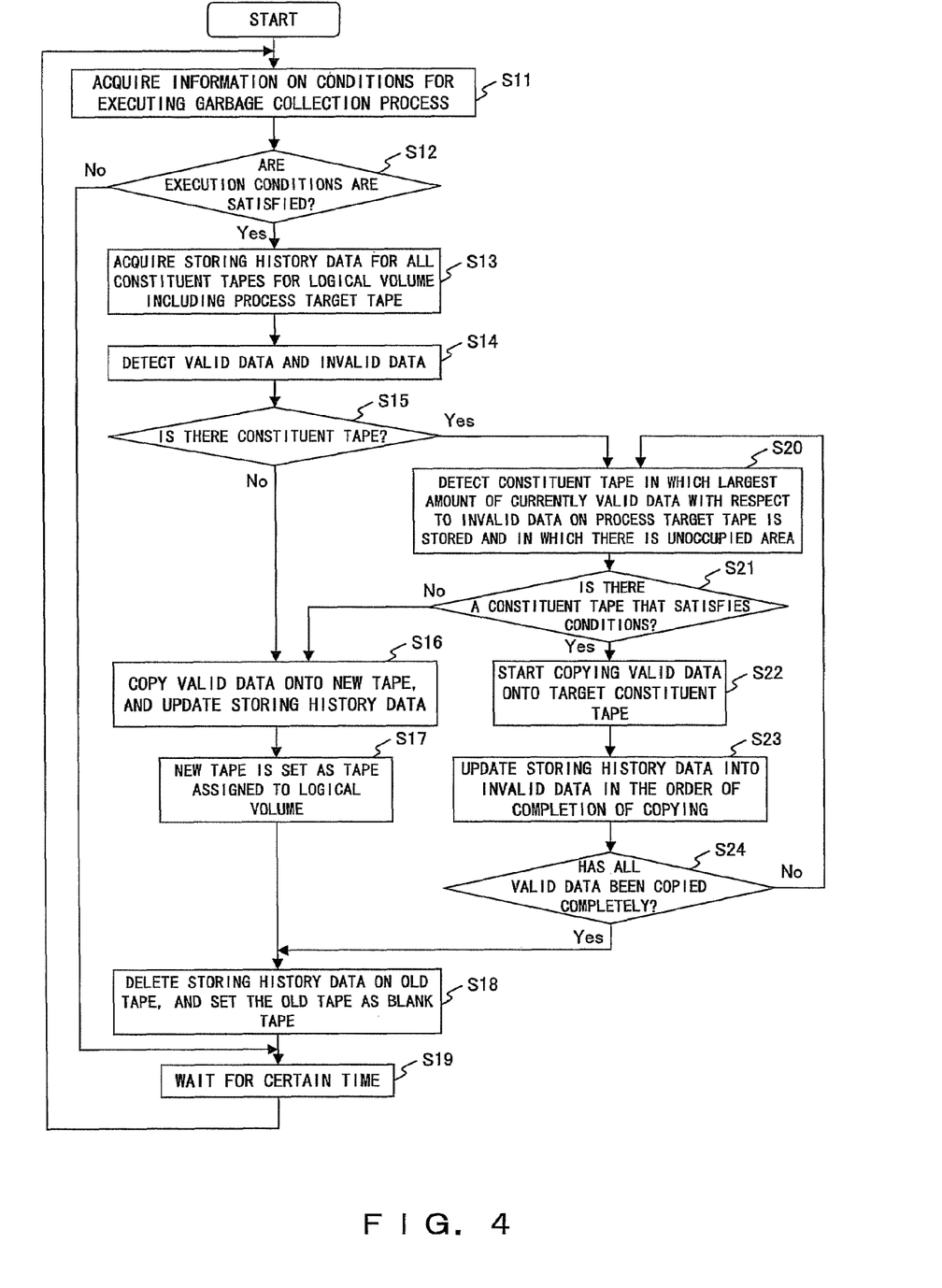
FIG. 4 is a flowchart for the garbage collection process performed in the present embodiment.

FIG. 4 is a flowchart for the garbage collection process performed in the present embodiment.

The process shown in FIG. 4 is executed by the above valid data storage unit 54.

In the process shown in FIG. 4, first, the conditions for executing the garbage collection process (for example the above setting data 53a) that is stored beforehand in a memory unit or the like is read (step S11), and it is determined whether or not these execution conditions are satisfied (step S12). The execution conditions can include arbitrary contents. For example, the time and date of execution can be the condition, and when the current day and time corresponds to the time and date specified in the execution condition, the determination result in step S12 is Yes. In this embodiment, all the constituent tapes are the process targets, and the processes in and subsequent to step S13 are sequentially and repeatedly executed on the respective magnetic tapes as the process targets in a one-by-one manner.

It is also possible to execute processes in which it is determined whether or not the conditions are satisfied for each magnetic tape, and when there is at least one constituent tape (target tape) that satisfies the conditions, the result of the determination in step 12 is Yes. Examples of these conditions are "The corresponding magnetic tape does not have an unoccupied area", "The corresponding magnetic tape stores invalid data that is larger than a certain amount", "The garbage ratio in the corresponding magnetic tape is equal to or higher than fifty percent" and the like. In this case, the constituent tape satisfying the conditions is handled as the process target tape, and the processes in and subsequent to step S13 are executed. The garbage ratio is a ratio of valid data to the entire data stored on one tape. Also, when the condition is "The corresponding magnetic tape stores invalid data that is larger than a certain amount", "The garbage ratio in the corresponding magnetic tape is equal to or higher than fifty percent" or the like, it is necessary to refer to the storing history data table 60 in order to discriminate between valid data and invalid data in a similar manner to that in step 14 (will be described later).

As described above, the conditions for executing the garbage collection process can be varied. However, the purpose of the garbage collection process is to remedy the situation in which an increase in invalid data causes losses. Accordingly, it is desirable to employ conditions that relate to the amount of invalid data (or the ratio of the invalid data). Thereby, it is possible to execute the garbage collection process at a more appropriate timing.

When the result of the determination in step S12 is Yes, history information for all the constituent tapes for the logical volume with which the target magnetic tape is associated is acquired from the storing history data table 60 (step S13). For example, when the magnetic tape, shown in FIG. 3, whose ID is "123" is the process target tape, all the records whose volume number 61 is "3" are extracted (in the example shown in FIG. 3, three records whose magnetic tape ID is "123" and whose magnetic ID is "124" are extracted) because the number of the logical volume is "3".

Thereafter, pieces of data in all the records acquired in the above step S13 are sorted into valid data and invalid data in accordance with the acquired history information (step S14). Specifically, it is determined whether the respective pieces of data stored on the process target tape and the respective pieces of data stored on the other constituent tapes that are associated with the logical volume with which the process target tape is associated are valid data or invalid data. It is also possible to execute the process in step S15 before executing the process in step S14, and when the result of the determination in step S15 is Yes, the process in step 14 is executed, and when the result of the same determination is No, it is only determined whether data stored on the target tape is valid or invalid.

An example of a way in which the above determination between valid data and invalid data in step S14 may be executed is as follows.

First, the valid data storage unit 54 sequentially selects, from all the records acquired in step S13, records as the process targets, and obtains a record whose MRB number (which is denoted by the numeral 62) is the same as that of the MRB number 62 of the selected record. This process can be recognized as a process in which the record whose volume number 61 and MRB number 62 are the same as those of the target record is retrieved by searching the storing history data table 60 because the records whose volume number 61 are the same as that of the target record that has already been extracted.

In the example shown in FIG. 3, there are two records whose volume number 61 is "3", and whose MRB number 62 is "1". Accordingly, when one of the above two records is the target record, the other one is retrieved as the search result.

Then, the storage time and date 65 of the above target records is compared with the current time and date, and also the storage time and date 65 of the record obtained by the search is compared with the current time and date. Then, the data corresponding to the record (history) whose storage time and date 65 is the closest to the current time and date is determined to be valid data and all the other data is determined to be invalid data. It is also possible for the records other than the record whose storage time and date 65 is the closest to the current time and date to be extracted, and data corresponding to the extracted storing history data to be determined to be invalid data, and the data other than the invalid data to be determined to be valid data. If this occurs, the result of the determination between valid data and invalid data will be temporarily stored in a memory unit or the like. Then, the same process will be performed on the next record. However, the above retrieved records are not target records, because the determination between the valid and invalid data has already been finished. In this manner, it is determined whether data corresponding to each of all the records (history) obtained in step S13 is valid data or invalid data, and the determination result is temporarily stored. The temporarily stored data is referred to as necessary in the processes in and subsequent to step S16 or in the processes in and subsequent to step S20.

Then, in a process in step S15, it is determined whether or not there is at least one constituent tape in the logical volume with which the process target tape is associated. In the example shown in FIG. 3, there is only one magnetic tape (constituent tape) that is associated with the logical volume whose volume number 61 is "20". This single magnetic tape has the magnetic tape ID "159", and when this magnetic tape is the process target, the result of the determination in step S15 is No. As described above, when there is only one constituent tape (No in step S15), there is no other constituent tape that can be used as the copy destination; accordingly, the same processes are performed as disclosed in Patent Document 1. Specifically, a new tape is assigned as the destination of the garbage collection process (coping), and the valid data stored on the process target tape is copied onto this new tape, and the storing history data table 60 is updated (step S16).

The above updating of the storing history data table 60 is a process of adding to the storing history data table 60 recording history of the data that has been recorded on the copy destination tape. Thereby, the data that was recorded on the process target tape (data in the copy source) is handled as invalid data, and when the same determination process as in step S14 is executed in one of the following steps, this data will always be handled as invalid data.

When all the pieces of valid data stored on the process target magnetic tape are copied completely, the new tape is set as one of the constituent tapes for the corresponding logical volume (step S17). Additionally, in the process in step S17, the magnetic tape ID of this new tape is added to the magnetic tape IDs, stored in a memory unit or the like, of the magnetic tapes that are used for backing up the data of each logical volume, which is not shown in the drawing.

When all the pieces of valid data on the process target tape are copied completely, the process target tape is set as a blank tape, and this tape is removed from the list of the constituent tapes for the corresponding logical volume (the magnetic tape ID of the process target tape stored in the memory unit or the like is deleted) (step S18).

Additionally, even when there is at least one other constituent tape (Yes in step S15), valid data on the process target tape cannot be copied onto other existing constituent tapes if none of the other constituent tapes has an unoccupied area (No in step S21). Accordingly, the processes in the above steps S16 and S17 are executed.

When there is at least one constituent tape that is not the process target tape for the logical volume with which the process target tape is associated (Yes in step S15), the constituent tape on which the largest amount of valid data with respect to invalid data in the process target tape is stored and in which there is an unoccupied area is determined to be the garbage collection destination tape (step S20). However, when there is no constituent tape that satisfies this condition, i.e., when none of the other constituent tapes has an unoccupied area (No in step S21), the process proceeds to step S16.

When there is at least one more constituent tape (Yes in step S21), valid data on the process target tape starts to be copied onto the tape that was determined to be the garbage collection process destination (step S22). For this process, the process target tape has been rewound, and the valid data is copied sequentially from the front end of the tape. The valid data has already been distinguished from invalid data on the basis of the above process. Also, the position at which the valid data is stored on the process target tape can be found on the basis of the data position number 64. Then, the storing history data table 60 is updated in the order of completion of copying of pieces of data (step S23). This process is the same as that in step S16, and the valid data in the garbage collection source tape (process target tape) is handled as invalid data after copying is completed.

Additionally, when the determination based on the storage time and date 65 is performed as described above, it is possible to determine whether each piece of data is valid or invalid. However, it is also possible to avoid the necessity of determining whether each piece of data is valid or invalid not only in this example, but also in the other examples. For example, items for flags that indicate whether the corresponding data is valid or invalid are added to the storing history data table 60 shown in FIG. 3, the value "1" of the flag indicates the validity and the value "0" of the flag indicates the invalidity, and the value of the flag in a newly added record is always set to be "1", and the value of the flag of the corresponding old record is set to be "0". The "corresponding old record" in the above garbage collection process is a record on the valid data on the above copy source tape, whose copying is completed.

When all the pieces of the valid data on the process target tape have been copied completely (Yes in step S24) after repeating the processes in steps S20 through s23, the process proceeds to step S18 above. However, in a case in which not all the pieces of the valid data on the process target tape can be copied onto the copy destination tape due to the fact that the copy destination tape that was determined to be the copy destination tape in step S23 does not have a sufficient unoccupied area, the constituent tape whose amount of valid data in relation to invalid data on the process target tape is the second largest next to the above copy destination tape is newly determined to be the garbage collection destination tape, and the copying process is continued. Also, when none of the constituent tapes have any unoccupied area remaining before all the pieces of the valid data on the process target tape have been copied completely, the determination result in step S21 is No, and accordingly the process proceeds to step S16 and the copy process continues by using a new tape.

After step S18 above, the process waits for a prescribed time period (step S19) and then returns to step S11.

As described above, in the present method, the unoccupied area on a constituent tape other than the process target tape is priorly used for rearrangement in the garbage collection process for magnetic tapes, and thereby it is possible to reduce (or to suppress increases in) the number of tapes (constituent tapes) that constitute the respective logical volumes. Also, by using information on destinations of recording valid data corresponding to invalid data on the process target tape when the copy destination tape for the valid data is determined, the recording of continuous data on one and the same tape is facilitated.

FIGS. 5A through 5D show examples of the rearrangement of data on the basis of the garbage collection process.

Figures 5A, 5B:
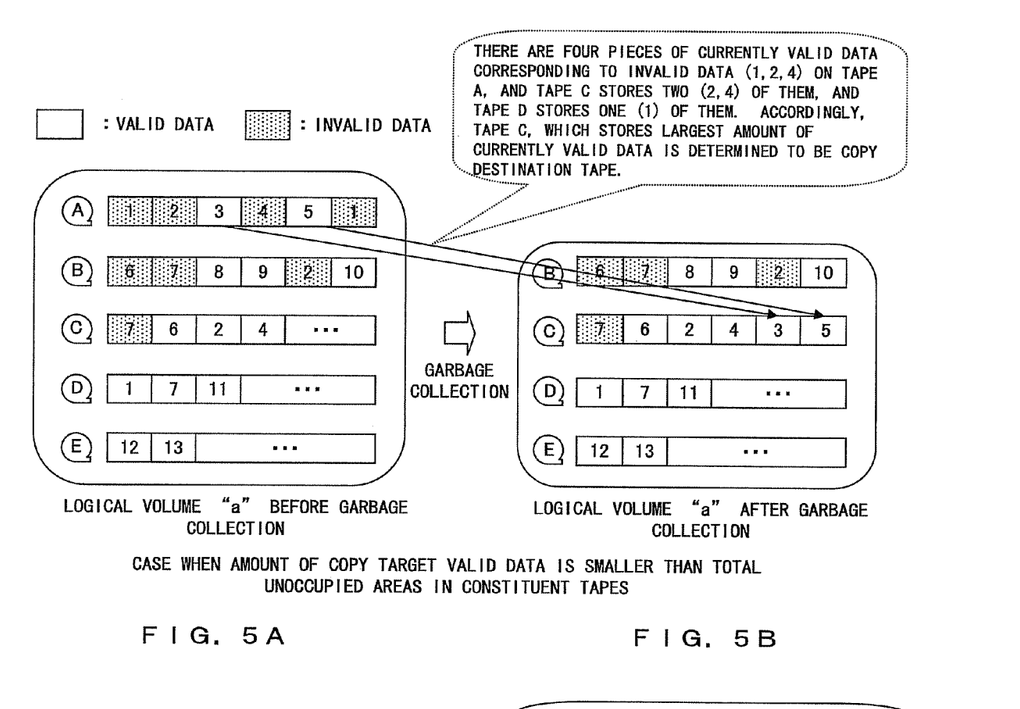
FIG. 5A is one view showing examples of the rearrangement of data based on the garbage collection process performed in the present embodiment.
FIG. 5B is another view showing examples of the rearrangement of data based on the garbage collection process performed in the present embodiment.
Figures 5C, 5D:
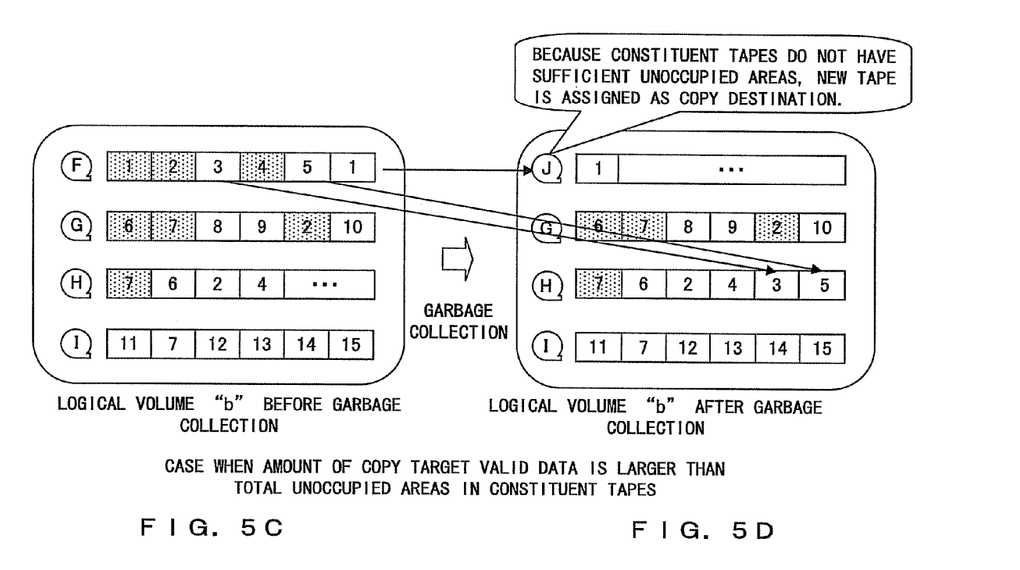
FIG. 5C is another view showing examples of the rearrangement of data based on the garbage collection process performed in the present embodiment.
FIG. 5D is another view showing examples of the rearrangement of data based on the garbage collection process performed in the present embodiment.

FIGS. 5A and 5B respectively show the data arrangement before and after the garbage collection process when the logical volume with which the process target tape is associated is the logical volume "a". FIGS. 5C and 5D respectively show the data arrangement before and after the garbage collection process when the logical volume with which the process target tape is associated is the logical volume "b". In FIGS. 5A and 5B, the process target tape is magnetic tape A, and in FIGS. 5C and 5D, the process target tape is magnetic tape F.

In FIGS. 5A through 5C, pieces of data 1, 2, 3, . . . are shown, and the pieces of data that are shown in a shaded manner are invalid data and the other pieces are the valid data. In FIG. 5A, for example, among the pieces of data stored on the magnetic tape A, pieces of data 1, 2, and 4 are invalid data, and pieces of data 3 and 5 are valid data.

First, FIGS. 5A and 5B are explained.

In the example shown in FIG. 5A, before the garbage collection process, the data stored in logical volume "a" is in a backed-up state in five magnetic tapes A through E caused by the backup process performed by the backup process unit 51. In other words, the number of magnetic tapes that are associated with logical volume "a" is five. Before the data exists in this state, the only magnetic tape that is used is magnetic tape A, and the backup process unit 51 copies in units of MRBs onto the magnetic tape A the pieces of data in logical volume "a" in the order of "1, 2, 3, 4, 5", and thereafter again stores data 1. This data 1 that is again stored is update data in the same block of the virtual logical unit as the block that first stored data 1 (the block of the virtual logical unit having the same volume number 61 and MRB number 62 in FIG. 3). Then, the data 1 that was first stored begins to be handled as invalid data. Thereafter, when data 6 (the next piece of data) is backed up, a new magnetic tape B is prepared as a constituent tape for that backup. In this method, the constituent tapes are sequentially added, and the state shown in FIG. 5A is achieved.

In the state shown in FIG. 5A, it is assumed that the magnetic tape A is determined to be the process target tape. In this case, the pieces of data 1, 2 and 4 are invalid data on the magnetic tape A, and the pieces of valid data corresponding to these pieces of invalid data are stored on a magnetic tape C (valid data of data 2 and 4) and a magnetic tape D (valid data of data 1), and the magnetic tape C is determined to be the copy destination tape because the magnetic tape C has an unoccupied area. Thereby, the pieces of valid data 3 and 5 that are stored on the magnetic tape A are copied onto the magnetic tape C, and the magnetic tape A is removed from the group of constituent tapes (is handled as a blank magnetic tape) because all the pieces of data stored on the magnetic tape A are invalid data.

Thereby, as shown in FIG. 5B, the number of constituent tapes is four, consisting of the magnetic tapes B, C, D, and E, i.e., the number of constituent tapes has been reduced. In contrast, in the conventional method described in Patent Document 1, a new tape is prepared, and the number of constituent tapes becomes six at least temporarily, and even when the magnetic tape A is removed after the process, the number of constituent tapes is still five.

Also, in the example shown in FIGS. 5C and 5D, it is assumed that the magnetic tape F is determined to be the process target tape. In this example, the tape H is the copy destination because the tape H is the only tape of the constituent tapes G, H, and I that has an unoccupied area. Then, because the tape H has no unoccupied area any more when the pieces of data 3 and 5 that were among the pieces of the valid data 3, 5, 1 stored on the magnetic tape F have been copied onto the tape H, a new tape J is added as a constituent tape, and data 1 is stored on the tape J in the example. In this example, the number of constituent tapes is not reduced, however, the existing constituent tapes are used to the full extent, i.e., the existing constituent tapes are efficiently used.

As described above, by using the garbage collection process according to the present method, it is possible to prevent an increase in the number of magnetic tapes that constitute logical volumes that would result from the ordinary garbage collection process or to reduce the number of magnetic tapes that constitute logical volumes, which leads to a reduction in cost. Additionally, by suppressing the discreteness of valid data, the number of processes of mounting and unmounting magnetic tapes can be reduced, which leads to improvements in reading performance when a sequential reading process is performed in volumes one volume at a time.

By using the above data storage device or the like according to the present invention, the optimization of the garbage collection process for magnetic tapes used in a hierarchical storage system is realized, and thereby the number of magnetic tapes that constitute logical volumes can be reduced, which leads to reduction in cost. Additionally, by suppressing the discreteness of valid data, the number of processes of mounting and unmounting magnetic tapes can be reduced, which leads to improvements in reading performance when a sequential reading process is performed in volumes one volume at a time.

Figure 6:
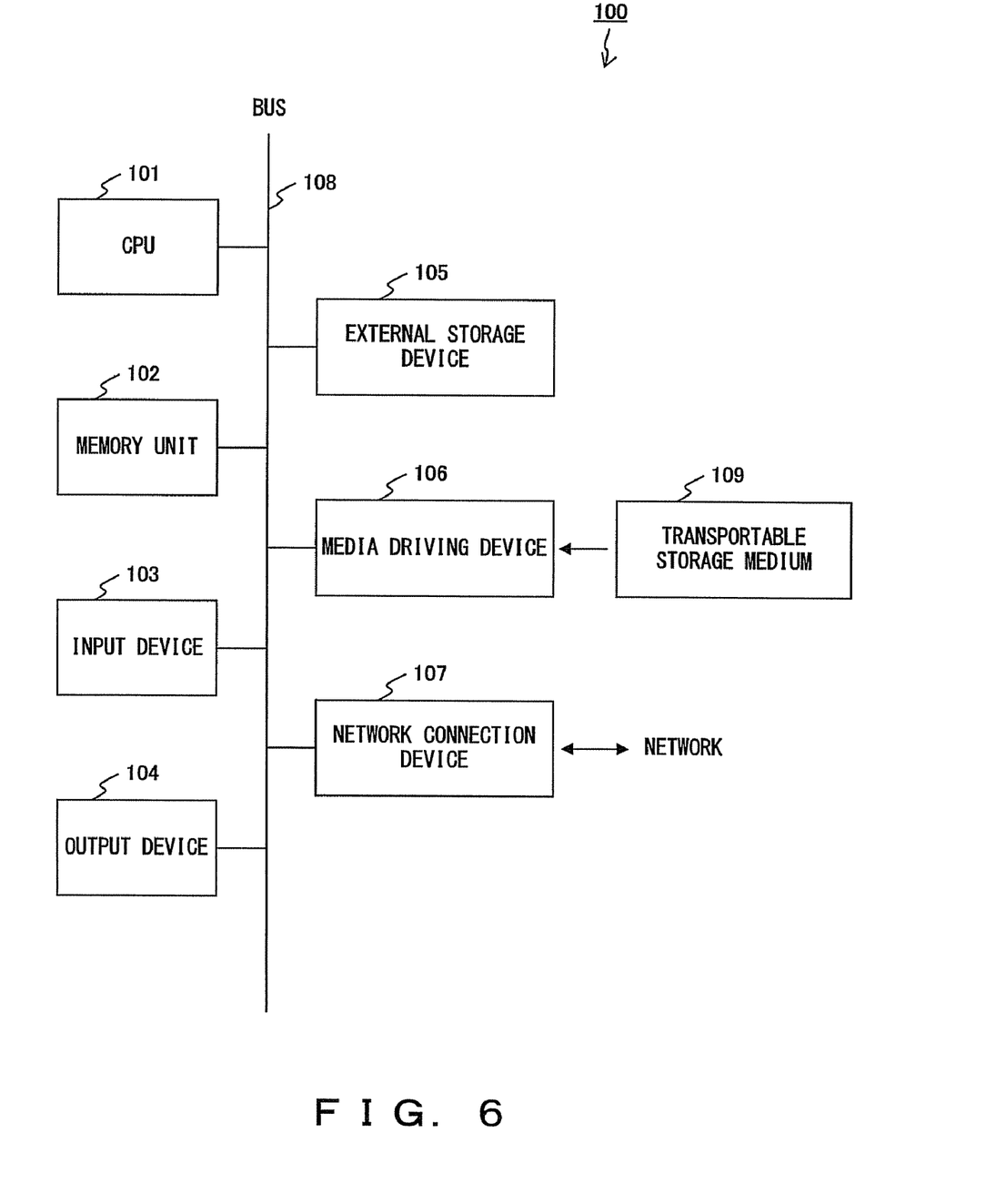
FIG. 6 shows a configuration example of hardware of the computer used in the present embodiment.

FIG. 6 shows a configuration example of hardware of a computer (a data storage management server or the like) that realizes the above data storage process.

A computer 100 shown in FIG. 6 comprises a CPU 101, a memory unit 102, an input device 103, an output device 104, an external storage device 105, a media driving device 106, and the like in a connected state via a bus 108. Also, the computer 100 may comprise a network connection device 107. The configuration shown in FIG. 6 is an example, and the scope of the present invention is not limited to this example.

The CPU 101 is a central processing unit that controls the entirety of the computer 100.

The memory unit 102 is a memory unit such as a RAM device or the like for temporarily storing a program or data stored in the external storage device 105 (or a transportable storage medium 109) when the program is executed or the data is updated. The CPU 101 executes the above described various processes (especially the process shown in the flowchart in FIG. 4) by using the program/data read to the memory unit 102.

The external storage device 105 may be, for example, a magnetic disk device, an optical disk device, a magneto optical disk device, or the like for storing programs/data and the like that are used for realizing the above various functions. In other words, the external storage device 105 stores application programs by which the CPU 101 executes the processes shown in FIG. 4, data shown in FIG. 3, and the like. Also, these programs/data may be stored in the transportable storage medium 109.

The media driving device 106 reads the program/data and the like stored in the transportable storage medium 109. Examples of the transportable storage medium 109 are an FD (flexible disk), a CD-ROM disk, a DVD, a magneto-optical disk, and the like.

The network connection device 107 is connected to a network in order to realize transmission and reception of program/data and the like to and from external information processing devices. Examples of the input device 103 include a keyboard, a mouse, and the like, and examples of the output device 104 include a display device and the like. However, these examples of the input device 103 and output device 104 are not essential for realizing the present invention.

Figure 7:
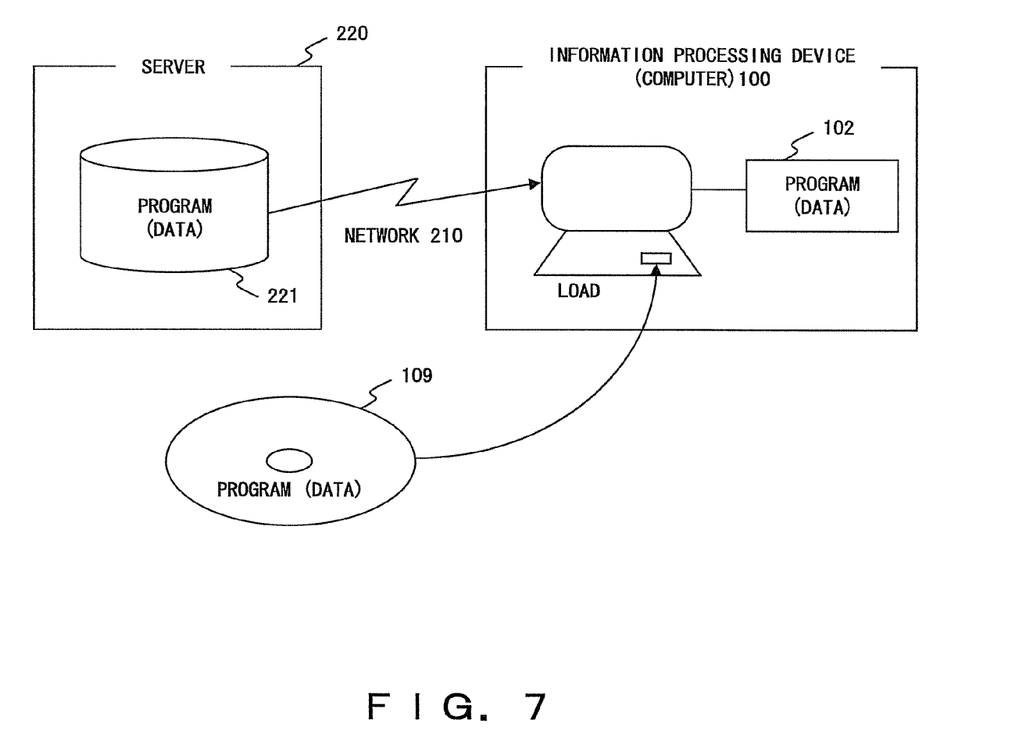

FIG. 7 shows an example of a storage medium storing the above program and the like, and downloading of the program and the like.

As shown in FIG. 7, it is possible to read the program/data for realizing the above respective functions from the transportable storage medium 109 out to the information processing device (computer) 100, and to store the read program/data in the memory unit 102 in order to execute the program/data, and it is also possible to download the program/data stored in a storage unit 221 in an external server 220 via a network 210 (the Internet or the like) that is connected via the network connection device 107.

Also, the scope of the present invention is not limited to a device or a method, and the present invention can be implemented in a form of a storage medium (transportable storage medium 109 or the like) itself that stores the above program/data, and also in the form of the above program itself.

What is claimed is:

1. A data storage device for storing, in a sequential storage medium that stores data through sequential accesses, data stored in a random storage medium that stores data through random accesses, comprising:

history storing means storing, when data is stored in the sequential storage medium, storing history information on the stored data; and data re-storing means discriminating between valid data and invalid data that are stored in the sequential storage medium that is an arbitrary process target, and storing, at an arbitrary timing and on the basis of the discrimination result and the storing history information stored by the history storing means, the valid data in a sequential storage medium in use that is other than the process target sequential storage medium;

wherein: the invalid data is data that exists before an update in cases in which data stored in the random storage medium is undated and the undated data is stored in the sequential storage medium, and valid data of the process target sequential storage medium that is stored in the sequential storage medium that is in use and that is other than the process target sequential storage medium is also handled as invalid data; and when the process target sequential storage medium has no more valid data, the data re-storing means handles the process target sequential storage medium as a blank medium.

2. The data storage device according to claim 1, wherein: when there is a plurality of storage media that are in use and that are other than the process target sequential storage medium, the data re-storing means stores the valid data in a sequential storage medium that is storing the largest amount of valid data that corresponds to the invalid data stored in the process target sequential storage medium.

3. The data storage device according to claim 1, wherein: when there is not a sequential storage medium that is in use and that is other than the process target sequential storage medium, or when there are no sequential storage media that are in use and that are other than the process target that have an unoccupied area, the data re-storing means stores the valid data in a new sequential storage medium.

4. The data storage device according to claim 1, wherein:
the storing history information includes a volume number, an MRB number, a sequential storage medium ID, a data position number, and storage time and data for data stored in the sequential storage medium; and
the data re-storing means extracts all pieces of storing history information having the sequential storage medium ID of the process target sequential storage medium, and handles, as the valid data, data corresponding to storing history information whose storing time and date is closest to the current time and date in a case in which the extracted pieces of storing history information include pieces of storing history information having volume numbers and MRB numbers that are respectively identical to each other.

5. The data storage device according to claim 1, wherein:
the random storage medium is a hard disk, and the sequential storage medium is a magnetic tape.

6. The data storage device according to claim 1, wherein:
the data re-storing means handles as the process target sequential storage medium a sequential storage medium in which the amount of the invalid data exceeds a certain amount or a certain ratio.

7. The data storage device according to claim 1, wherein:
one or a plurality of sequential storage media is assigned to each logical volume associated with the random storage medium, and the sequential storage medium that is in use and that is other than the process target sequential storage medium is a sequential storage medium that is assigned to a logical volume associated with the process target sequential storage medium.

8. A method of rearranging data stored in a sequential storage medium used in a data storage device for storing, in the sequential storage medium that stores data through sequential accesses, data stored in a random storage medium that stores data through random accesses, the method comprising:
   a history storing step of storing data in the sequential storage medium, and of recording storing history information on the stored data; and
   a data re-storing step of detecting, on the basis of the storing history information stored in the history storing step, valid data and invalid data that are stored in the sequential storage medium that is an arbitrary process target, and storing, on the basis of the detection result, the valid data in a sequential storage medium in use that is other than the process target sequential storage medium;
   wherein: the invalid data is data that exists before an update in cases in which data stored in the random storage medium is updated and the updated data is stored in the sequential storage medium, and valid data of the process target sequential storage medium that is stored in the sequential storage medium that is in use and that is other than the process target sequential storage medium is also handled as invalid data; and when the process target sequential storage medium has no more valid data, the data re-storing step handles the process target sequential storage medium as a blank medium.

9. A computer readable recording medium recording a program for causing a computer to store, in a sequential storage medium that stores data through sequential accesses, data stored in a random storage medium that stores data through random accesses, in order to execute:
   a history storing function of storing data in the sequential storage medium and of recording storing history information on the stored data; and
   a data re-storing function of detecting valid data and invalid data that are stored in the sequential storage medium that is an arbitrary process target, and storing, on the basis of the detection result, the valid data in a sequential storage medium in use that is other than the process target sequential storage medium, on the basis of the storing history information stored by the history storing function;
   wherein: the invalid data is data that exists before an update in cases in which data stored in the random storage medium is updated and the updated data is stored in the sequential storage medium, and valid data of the process target sequential storage medium that is stored in the sequential storage medium that is in use and that is other than the process target sequential storage medium is also handled as invalid data; and when the process target sequential storage medium has no more valid data, the data re-storing function handles the process target sequential storage medium as a blank medium.

* * * * *

UNITED STATES PATENT AND TRADEMARK OFFICE
CERTIFICATE OF CORRECTION

PATENT NO.        : 7,668,875 B2                                          Page 1 of 1
APPLICATION NO.   : 11/864402
DATED             : February 23, 2010
INVENTOR(S)       : Naoyoshi Toshine It is certified that error appears in the above-identified patent and that said Letters Patent is hereby corrected as shown below:

Column 12, Line 49, change "medium is undated and the undated data is stored in the" to --medium is updated and the updated data is stored in the--.

Signed and Sealed this

Eleventh Day of May, 2010

David J. Kappos
*Director of the United States Patent and Trademark Office*